March 20, 1956   H. C. DOANE   2,738,756
ILLUMINATED DIAL DEVICES
Filed Nov. 1, 1954   2 Sheets-Sheet 1
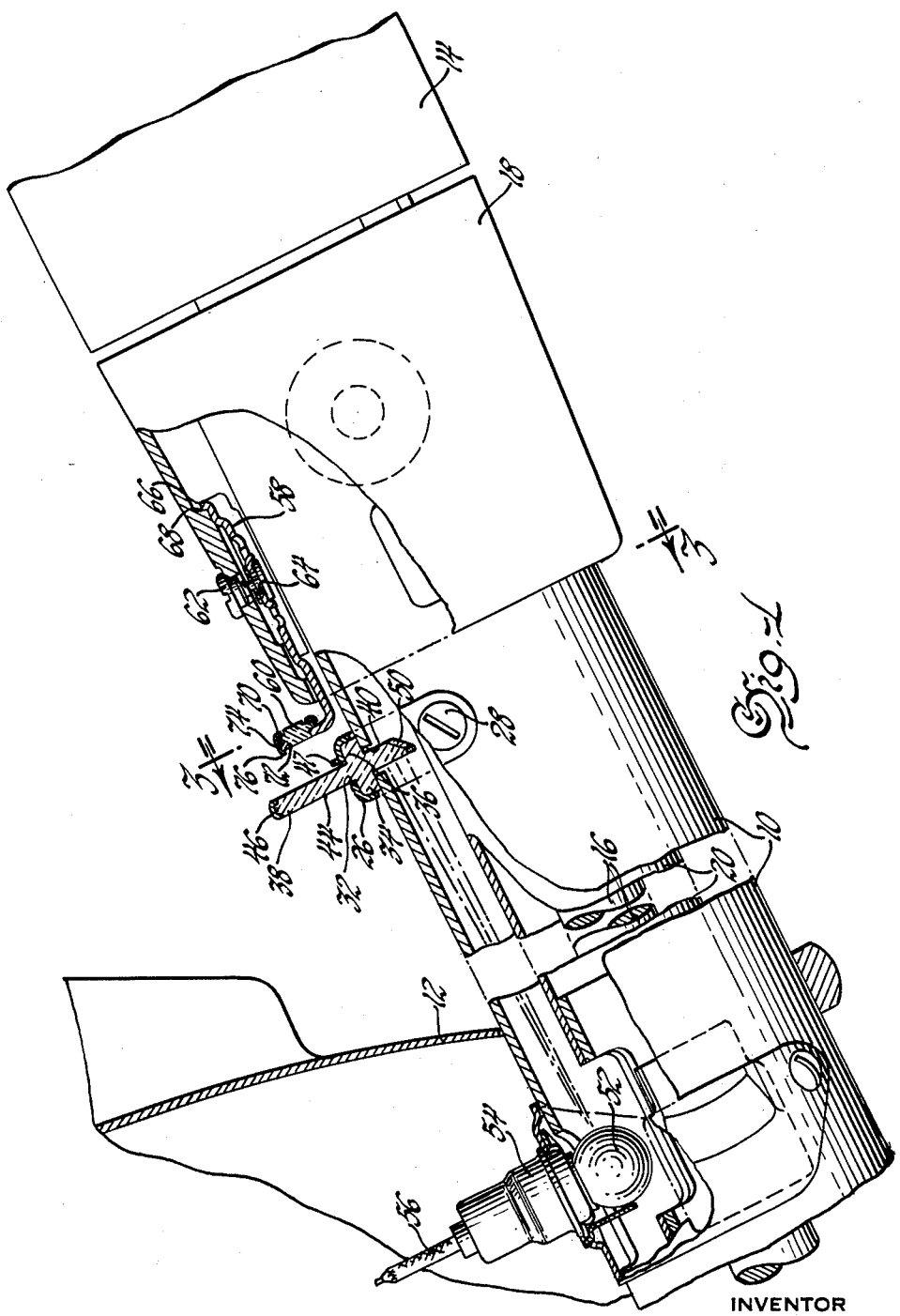
INVENTOR
Harry C. Doane
BY
C. J. Sibbe
ATTORNEY March 20, 1956  H. C. DOANE  2,738,756
ILLUMINATED DIAL DEVICES
Filed Nov. 1, 1954  2 Sheets-Sheet 2
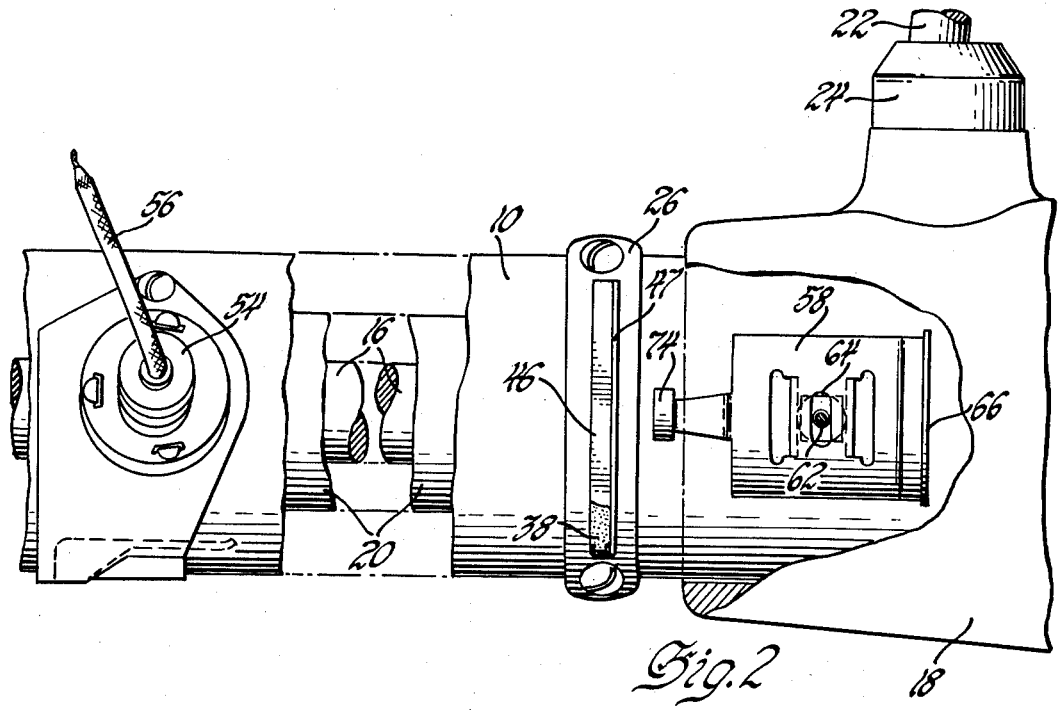
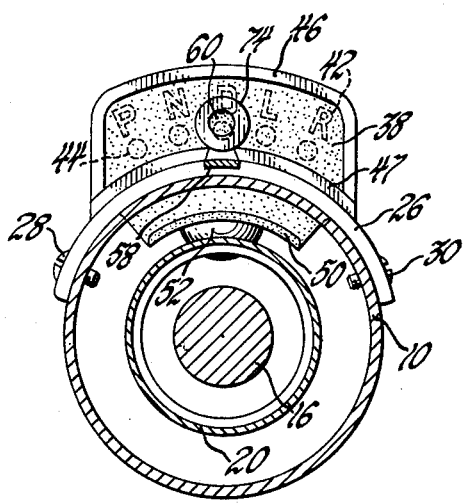
INVENTOR
Harry C. Doane
BY
C. J. Sible

United States Patent Office 2,738,756
Patented Mar. 20, 1956

2,738,756

ILLUMINATED DIAL DEVICES

Harry C. Doane, Flint, Mich., assignor to General Motors Corporation, Detroit, Mich., a corporation of Delaware Application November 1, 1954, Serial No. 465,934

6 Claims. (Cl. 116—124)

This invention relates to illuminated dial devices and more particularly to dials which may be illuminated for indicating a selected position of adjustment of an associated mechanism.

In operating motor vehicles equipped with automatic power transmissions, it is conventional to select a desired setting for a given transmission by moving a control lever mounted on the steering column. When lighting conditions are poor or when the steering wheel is turned or being turned with relation to the control lever, an operator may be confused or inconvenienced in his attempts quickly to ascertain the effective position of the control lever. Selection of a transmission setting should obviously be made quickly and as desired in order to contend with modern traffic conditions and to avoid possible damage or undue strain with respect to the transmission.

An object of the present invention is to provide an improved dial device which may be illuminated and which effects a distinct reading of indicia.

A feature of the invention is a dial device including a translucent dial, a source of artificial light for the dial and a lens arranged to transmit light emitted from the dial to an observer or operator clearly to indicate a reading.

Another feature is a dial having indicia and a lens movable with respect to the dial clearly to show the setting of an associated mechanism.

Another feature is a dial device mounted on a vehicle steering column and which includes a translucent dial arranged to be illuminated by artificial light and a vivid lens arranged to be moved with a transmission control lever and in relation with indexed portions of the dial.

These and other important features of the invention will now be described in detail in the specification and then pointed out more particularly in the appended claims.

In the drawings:

Fig. 1 is an elevational view partly in section of a steering column of a motor vehicle showing the dial device embodying the present invention, certain parts being broken away more clearly to illustrate the structure;

Fig. 2 is a top view of the structure shown in Fig. 1 looking in a direction normal to the axis of the column and with portions being broken away more clearly to show the dial device; and Fig. 3 is a sectional view taken along the line 3—3 of Fig. 1.

With reference to the drawings, the numeral 10 designates a steering column fixed in position upon a motor vehicle. This column inclines downwardly and forwardly beneath an instrument panel 12 of the vehicle and supports a steering wheel, a portion of the hub thereof being designated by the numeral 14. The steering wheel is not shown in the drawings but it will be understood that it is secured to the upper end of a steering shaft 16 which extends longitudinally and substantially concentrically within the column 10.

Mounted concentric with the upper end of the column 10, but outside thereof, is a sleeve 18 which is connected to an inner tube arrangement 20 for operating or adjusting the setting of the vehicle transmission. The arrangement of the sleeve 18 with respect to the tube 20 is not specifically disclosed herein as it forms no part of the present invention. It will be appreciated, however, that rotation of the sleeve 18 and tube 20 is relied upon to secure a desired setting for the transmission. As is conventional, the sleeve 18 may be rotated by means of a lever 22 which is fixed to the sleeve by means of a suitable connection 24.

An arcuate bezel 26 is fixed to the column 10 by means of screws 28 and 30. This bezel is slotted at 32 and is of U-shaped cross section to engage shoulder portions 34 and 36 of a dial 38 and thereby retain the latter in position on the column 10. A slot 40 is formed in the column and the arrangement is such that the dial 38 extends through the slot and upwardly from the bezel.

The dial 38 is made of translucent material such as Lucite or any other equivalent material and bears indicia in the form of spaced letters 42 as well as spaced conical depressions 44. In the interest of attractive as well as a more distinctive appearance, these indicia are filled with a light-reflective paint. A U-shaped frame 46 of metal is arranged to protect the top and side edges of the dial and the ends of this frame are conveniently received and crimped in position within the bezel 26. A flange 47 is made integral with the bezel and extends along the base of the exposed portion of the dial.

That portion of the dial 38 which extends into the column 10 is beveled as at 50 whereby light beams received from a source located forwardly of the dial are reflected upwardly into the material of the dial. Conveniently, such light source constitutes a light bulb or lamp 52 supported within the column 10 by means of a conventional light socket 54 to which current is supplied by an insulated wire 56.

Mounted within the sleeve 18 is a plate 58 which supports a lens 60 in a position to the rear of the dial 38 so that light emitted from the dial will be transmitted by the lens for observance by the operator of the vehicle. The bracket 58 is so arranged as to be spaced from the column 10 in order freely to rotate with respect thereto in obtaining a setting. The plate is held in position on the sleeve 18 by a suitable screw arrangement 62 which passes through a slot 64 formed in the plate. The rear margin of the plate presents a flange or shoulder portion 66 which is adapted to engage a shoulder portion 68 of the sleeve 18. It will be understood that an adjustment of the plate 58 with respect to the sleeve 18 by means of the screw arrangement 62 serves to lock the lens 60 in a proper position with respect to the dial 38 so that the dial reading which represents the setting of the vehicle transmission may be indicated by light rays transmitted by the lens. The lens 60 is provided with an annular shoulder portion 70 and a cylindrical portion 72. The cylindrical portion extends through an opening provided in the upturned end of the plate 58 and the shoulder portion 70 is held in clamped relation with the plate 58 by means of an annular clamping member 74. An arcuate portion 76 of the clamping member is bent inwardly securely to hold the lens in position on the plate.

In the instant disclosure the indicia on the dial 38 are so formed as to indicate the letters "P," "N," "D," "L" and "R." These refer, respectively, to the "Park," "Neutral," "Drive," "Low Gear" and "Reverse" positions or settings of the associated vehicle transmission.

From the foregoing description, it is seen that a device has been provided which clearly indicates the setting of the transmission under any condition of lighting.

Light from the lamp 52 is deflected by the beveled edge surface 50 and is reflected or emitted from the indicia 42 and 44 in a direction making the dial and indicia clearly observable by the vehicle operator. It is also evident that by use of the instant device, no glare is encountered and the lens 60 improves visibility of a specific reading of the dial as it causes a bright and contrasting light beam or spot to appear in a position corresponding to the dial reading.

Conveniently, the lens 60 may be made of colored glass or plastic in order that a pronounced contrast be presented between the lens and the dial. A red lens has been found to be very effective and vivid and is preferred although a clear lens may be employed to achieve an excellent result.

The invention has been shown and described in connection with a dial for indicating the settings of controls for automatic transmissions, but it is apparent that it is adapted for other uses such as in displays for advertising or in devices for signaling. Various modifications may be employed within the scope of the claims which follow without departing from the invention.

I claim:

1. A dial device comprising a casing, a dial of translucent material bearing indicia and extending through the wall of said casing, a source of light mounted in said casing, one edge of said dial being within said casing and being beveled to deflect light from said source into said dial, a lever movably mounted with respect to said casing, and a lens associated with said lever to move therewith as an indicator and arranged to transmit light emitted from said dial.

2. A dial device comprising a fixed casing, a dial of translucent material bearing indicia and extending through the wall of said casing, a source of light mounted in said casing, one edge of said dial being beveled to deflect light from said source and into said dial material outside of said casing, a lever movably mounted with respect to said casing, and a vivid lens associated with said lever to move therewith in a plane parallel with said dial and arranged to transmit light emitted from said dial.

3. A dial device comprising a cylindrical casing, an arcuate bezel fixed to the wall of said casing, a dial of translucent material bearing indicia and retained by said bezel to extend through the wall of said casing, a source of light mounted in said casing, one edge of said dial being beveled to deflect light from said source into said dial, said light source and beveled edge being substantially the same distance from said wall, a lever movably mounted about the axis of said casing, and a lens associated with said lever to move therewith and directed toward said dial to transmit light received from the latter.

4. A dial device comprising a casing, a dial of translucent material bearing indicia and extending through a slot in the wall of said casing, a source of light mounted in said casing, one edge of said dial within said casing being beveled to deflect light from said source into said dial material, a lever movably mounted with respect to said casing, a lens arranged to move with said lever and positioned to transmit light emitted from said dial, and said lens and said light source being located on opposite sides of said dial.

5. A dial device for use on a vehicle comprising a steering column in the form of a cylindrical casing, a slot in said casing, an arcuate bezel fixed to said casing in registry with said slot, a dial of translucent material retained on said casing by said bezel and bearing indicia, said dial extending through the said slot, a source of light in said casing, an edge of said dial within said casing being beveled to deflect light from said source into said dial material through said slot, a transmission control lever mounted for arcuate movement with respect to said casing, a vivid lens associated with said lever to move therewith as an indicator and arranged to transmit light emitted from said dial, and said lens and said light source being arranged on opposite sides of said dial.

6. In combination in an automotive vehicle, a fixed steering column casing, a transmission shifting lever mechanism rotatably mounted in coaxial relation with said casing, a dial of light transmitting material having an exposed portion bearing indicia outside the wall of said casing, a source of light in said casing, an end portion of said dial extending into said casing with an edge beveled and positioned to deflect light from said source outwardly to said indicia, a lens in registry with a restricted area of said exposed portion to transmit light received therefrom and mounted to rotate with said mechanism, and the arrangement being such that the lens cooperates with the said light source and indicia to show the transmission setting selected.

References Cited in the file of this patent

UNITED STATES PATENTS

| | | |
|---|---|---|
| 2,272,806 | Klein | Feb. 10, 1942 |
| 2,671,425 | Schneider | Mar. 9, 1954 |
| 2,672,117 | Morphew | Mar. 16, 1954 |